United States Patent
Dole et al.

(10) Patent No.: US 8,820,795 B2
(45) Date of Patent: Sep. 2, 2014

(54) FITTING FOR JOINING PIPE ELEMENTS

(75) Inventors: Douglas R. Dole, Whitehouse Station, NJ (US); John Gibb, Beeton (CA)

(73) Assignee: Victaulic Company, Easton, PA (US)

( * ) Notice: Subject to any disclaimer, the term of this patent is extended or adjusted under 35 U.S.C. 154(b) by 70 days.

(21) Appl. No.: 13/364,412

(22) Filed: Feb. 2, 2012

(65) Prior Publication Data

US 2013/0200609 A1    Aug. 8, 2013

(51) Int. Cl.
*F16L 43/00* (2006.01)

(52) U.S. Cl.
USPC ...... 285/179; 285/373; 285/367; 285/133.21; 285/133.3

(58) Field of Classification Search
USPC ......... 285/373, 419, 411, 367, 133.21, 133.3, 285/179
See application file for complete search history.

(56) References Cited

U.S. PATENT DOCUMENTS

| 1,020,123 | A | 3/1912 | Brampton et al. |
|---|---|---|---|
| 1,203,989 | A | 7/1916 | Dehn |
| 1,287,108 | A | 12/1918 | Robinson et al. |
| 1,379,811 | A | 5/1921 | Fyffe |
| 1,770,271 | A | 7/1930 | Hoppes |
| 1,831,641 | A | 11/1931 | Skinner |
| 1,969,043 | A | 8/1934 | Sharp |
| 1,999,045 | A | 4/1935 | Goetz |
| 2,094,258 | A | 9/1937 | Thompson |
| 2,128,720 | A | 8/1938 | Tweedale |
| 2,412,394 | A | 12/1946 | Giles |
| 2,463,235 | A | 3/1949 | Andrews |
| 2,958,546 | A | 11/1960 | Lee |
| 3,148,896 | A | 9/1964 | Chu |
| 3,153,550 | A | 10/1964 | Hollett |
| 3,362,730 | A * | 1/1968 | St Clair et al. ............ 285/369 |
| 3,466,069 | A | 9/1969 | Hoke et al. |
| 3,517,701 | A | 6/1970 | Smith |
| 3,596,935 | A | 8/1971 | McGeoch, Sr. |
| 3,633,943 | A | 1/1972 | Ramm et al. |
| 3,825,286 | A | 7/1974 | Henry, III |
| 3,920,270 | A | 11/1975 | Babb, Jr. |
| 3,944,260 | A | 3/1976 | Petroczky |
| 4,018,979 | A | 4/1977 | Young |
| 4,284,298 | A | 8/1981 | Kaufmann, Jr. |

(Continued)

FOREIGN PATENT DOCUMENTS

| DE | 3443942 A1 | 6/1985 |
|---|---|---|
| DE | 3443943 A1 | 6/1985 |

(Continued)

OTHER PUBLICATIONS (Copenheaver, Blaine R.) PCT International Search Report and Written Opinion regarding International Application No. PCT/US2012/062148; dated Mar. 19, 2013.

(Continued)

*Primary Examiner* — David E Bochna
(74) *Attorney, Agent, or Firm* — Ballard Spahr LLP (57) ABSTRACT

A fitting for joining pipe elements together includes housing portions held preassembled in spaced apart relation to permit pipe elements to be inserted without disassembly of the fitting. Elbow and tee fittings include sealing elements which support the housing portions in spaced relation. Angled surfaces on each housing portion interact with one another to rotate the housing portions in opposite directions to form a rigid joint between the fitting and the pipe elements.

23 Claims, 10 Drawing Sheets

(56) References Cited

U.S. PATENT DOCUMENTS

| | | |
|---|---|---|
| 4,461,498 A | 7/1984 | Kunsman |
| 4,633,913 A | 1/1987 | Carty et al. |
| 4,639,020 A | 1/1987 | Rung et al. |
| 4,652,023 A | 3/1987 | Timmons |
| 4,792,160 A | 12/1988 | Hwang |
| 4,838,584 A | 6/1989 | Dierksmeier |
| 4,861,075 A * | 8/1989 | Pepi et al. .................. 285/373 |
| 4,896,902 A * | 1/1990 | Weston .................. 285/373 |
| 5,018,768 A | 5/1991 | Palatchy |
| 5,022,685 A | 6/1991 | Stiskin et al. |
| 5,121,946 A | 6/1992 | Jardine |
| 5,230,537 A | 7/1993 | Newman |
| 5,452,922 A | 9/1995 | Ziu |
| 5,675,873 A | 10/1997 | Groess |
| 5,758,907 A * | 6/1998 | Dole et al. .................. 285/373 |
| 5,786,054 A | 7/1998 | Platusich et al. |
| 5,961,154 A | 10/1999 | Williams et al. |
| 6,276,726 B1 | 8/2001 | Daspit |
| 6,305,719 B1 | 10/2001 | Smith, Jr. et al. |
| 6,450,551 B1 | 9/2002 | Lee |
| 6,505,865 B2 | 1/2003 | Minemyer |
| 7,070,209 B2 | 7/2006 | Collins |
| 7,644,960 B2 | 1/2010 | Casey, Sr. et al. |
| 7,654,587 B2 * | 2/2010 | Gibb et al. .................. 285/373 |
| 7,798,535 B2 * | 9/2010 | Calhoun .................. 285/373 |
| 7,861,982 B1 | 1/2011 | McClure |
| 2005/0028366 A1 | 2/2005 | Bien et al. |
| 2009/0160183 A1 | 6/2009 | Felber |
| 2011/0154646 A1 | 6/2011 | Hagiya |
| 2012/0074689 A1 | 3/2012 | Petersen et al. |
| 2013/0327415 A1 | 12/2013 | Camp, Jr. et al. |

FOREIGN PATENT DOCUMENTS

| | | |
|---|---|---|
| GB | 2098297 | 11/1982 |
| KR | 100315861 | 11/2001 |
| KR | 1020090007813 | 1/2009 |
| KR | 100904419 | 6/2009 |
| KR | 1020090066767 | 6/2009 |
| WO | 9703811 | 2/1997 |

OTHER PUBLICATIONS

Young, Lee, International Search Report from corresponding International Patent Application No. PCT/US2013/021384, Jun. 11, 2013, pp. 1-2, United states Patent and Trademark Office as International Searching Authority.

Young, Lee, Written Opinion of the International Searching Authority from corresponding International Patent Application No. PCT/US2013/021384, Jun. 11, 2013, pp. 1-8, United States Patent and Trademark office as International Searching Authority.

No Author, Coupling; Dudeco, JJ Coupling Product Catalog, Date Unknown; pp. 1-8; Korea.

* cited by examiner

FITTING FOR JOINING PIPE ELEMENTS

FIELD OF THE INVENTION

This invention relates to fittings, such as elbow fittings and "tee" fittings used to join pipe elements together.

BACKGROUND

Fittings, such as elbows and tees, for joining pipe elements together end-to-end, comprise interconnectable housing portions that are positionable circumferentially surrounding the end portions of pipe elements. The term "pipe element" is used herein to describe any pipe-like item or component having a pipe-like form. Pipe elements include pipe stock as well as fluid control components such as valves, strainers, restrictors, pressure regulators and the like.

Each housing portion has projections, also called "keys", which extend radially inwardly and engage, for example, the outer surfaces of plain end pipe elements, pipe elements having a shoulder, or shoulder and bead, or circumferential grooves that extend around each of the pipe elements to be joined. Engagement between the keys and the pipe elements provides mechanical restraint to the joint and ensures that the pipe elements remain coupled even under high internal pressure thrust and external forces. The housing portions define an annular channel or pocket, for example, a receptacle, that receives a seal, for example a ring gasket, typically an elastomeric ring which engages the ends of each pipe element and cooperates with the housing portions and the pipe elements to provide a fluid tight seal. A tube within the fitting extends between the ring gaskets to ensure that the entire fitting remains fluid tight. The housing portions have connection members, typically in the form of lugs which project outwardly from the housings. The lugs are adapted to receive adjustable fasteners, such as nuts and bolts, which are adjustably tightenable to draw the housing portions toward one another.

Methods of securing pipe elements together comprise a sequential installation process when fittings according to the prior art are used. Typically, the fitting is received by the technician with the housing portions bolted together, the ring gaskets and tube comprising the sealing element being captured between the housing portions of the fittings. The technician first disassembles the fitting by unbolting it, removes the ring gaskets, lubricates them (if not pre-lubricated) and places them around the ends of the pipe elements to be joined. Installation of the ring gaskets often requires that they be lubricated and stretched to accommodate the pipe elements. With the ring gaskets in place on the pipe elements, the tube is engaged with the ring gasket on each pipe element. The housing portions are then placed one at a time around the ring gaskets and tube, straddling the ends of the pipe elements. During placement, the housing portions engage the ring gaskets, the keys are aligned with the grooves in the pipe elements (when present), the bolts are inserted through the lugs, the nuts are threaded onto the bolts and tightened, drawing the housing portions toward one another, compressing the ring gaskets to effect a seal between the pipe elements and the tube. The keys are engaged within the grooves in the pipe elements to provide mechanical constraint.

As evident from the previous description, installation of fittings according to the prior art requires that the technician typically handle as many as 13 individual piece parts, and must totally disassemble and reassemble the fitting. Significant time, effort and expense would be saved if the technician could install a fitting without first totally disassembling it and then reassembling it, piece by piece.

SUMMARY

The invention concerns a fitting for connecting at least two pipe elements together. In one example embodiment, the fitting comprises first and second housing portions attached to one another and defining at least first and second receptacles wherein the first receptacle is not coaxially aligned with the second receptacle. The first and second receptacles respectively define first and second openings for receiving the pipe elements. The housing portions further define a fluid path extending between the first and second receptacles. A plurality of adjustable fasteners attach the first and second housing portions to one another. The housing portions are supported in spaced apart relation sufficient to permit the pipe elements to be inserted into the receptacles while the housing portions are attached to one another. The fasteners are adjustably tightenable so as to draw the housing portions toward one another and bring the receptacles into engagement with the pipe elements so as to affix the pipe elements together.

The first receptacle is not coaxially aligned with the second receptacle. In one such example embodiment, the first receptacle surrounds a first axis oriented coaxially with the first opening and the second receptacle surrounds a second axis oriented coaxially with the second opening, the first and second axes being angularly oriented with respect to one another. The first and second axes may have an orientation angle from about 90° to about 174° with respect to one another.

In another embodiment, the first and second housing portions may further define a third receptacle. In this embodiment the third receptacle defines a third opening for receiving one of the pipe elements. The housing portions further define the fluid path to extend between the first, second and third receptacles. In an example embodiment of a fitting having a third receptacle, the first receptacle may surround a first axis oriented coaxially with the first opening, the second receptacle may surround a second axis oriented coaxially with the second opening, and the third receptacle may surround a third axis oriented coaxially with the third opening. The first and third axes may be co-linear with one another, the second axis may be angularly oriented with respect to the first and third axes. The first and second axes may have an orientation angle from about 30° to about 150° with respect to one another.

An example fitting embodiment may further comprise at least a first angularly oriented surface located on the first housing portion, and at least a second angularly oriented surface located on the second housing portion. The first and second angularly oriented surfaces are in facing relation and slide over one another when the fasteners are tightened to bring the first and second angularly oriented surfaces in contact. Sliding motion between the first and second angularly oriented surfaces causes the first and second housing portions to rotate in opposite directions relatively to one another.

In example fitting may further comprise a plurality of lugs extending from each of the first and second housing portions. Each of the lugs define a hole for receiving one of the fasteners. In this example embodiment the first angularly oriented surface portion is located on one of the lugs on the first housing portion, and the second angularly oriented surface portion is located on one of the lugs on the second housing portion.

In another example embodiment, the fitting may comprise a plurality of lugs extending from each of the first and second housing portions. Each of the lugs defines a hole for receiving one of the fasteners. At least two of the lugs on the first housing portion each have a first angularly oriented surface. At least two of the lugs on the second housing portion each have a second angularly oriented surface. Each of the first angularly oriented surfaces are in facing relation with a respective one of the second angularly oriented surfaces. The first and second angularly oriented surfaces slide over one another when the fasteners are tightened to bring the first and second angularly oriented surfaces in contact. Sliding motion between the first and second angularly oriented surfaces cause the first and second housing portions to rotate in opposite directions relatively to one another.

The fitting may further comprise a first seal positioned within the first receptacle. The first seal surrounds the first opening. A second seal is positioned within the second receptacle and surrounds the second opening. A tube extends within the fitting between the first and second seals. The tube may be integrally formed with the first and second seals, or the seals may sealingly engage the tube when they are compressed between the first and second housing portions.

An example fitting embodiment has a first seal positioned within the first receptacle and surrounding the first opening. A second seal is positioned within the second receptacle and surrounds the second opening. A third seal is positioned within the third receptacle and surrounds the third opening. A tube extends within the fitting between the first, second and third seals.

The tube may be integrally formed with the first, second and third seals. In an alternate embodiment, the seals sealingly engage the tube when the seals are compressed between the first and second housing portions. The first and second housing portions may be supported in the spaced relation by contact with the first and second seals. To that end, the first and second seals may have an outer circumference sized to support the housing portions in spaced apart relation sufficient to permit the pipe elements to be inserted into the receptacles. In an alternate embodiment, the first and second seals may each have at least one projection extending radially outwardly therefrom. The at least one projection on each of the seals engages one of the first and second housing portions and thereby supports the housing portions in spaced apart relation sufficient to permit the pipe elements to be inserted into the receptacles.

In a particular example embodiment, the at least one projection on each of the first and second seals comprises an arch extending outwardly from each of the first and second seals. At least one of the receptacles may comprise a recess positioned on an inner surface thereof for receiving the at least one projection extending from one of the first and second seals.

In another embodiment, the first and second housing portions may be supported in the spaced relation by contact with the first, second and third seals. The first, second and third seals may have an outer circumference sized to support the housing portions in the spaced apart relation sufficient to permit the pipe elements to be inserted into the receptacles.

In an example embodiment, the first, second and third seals each have at least one projection extending radially outwardly therefrom. The at least one projection on each of the seals engages one of the first and second housing portions and thereby supports the housing portions in the spaced apart relation sufficient to permit the pipe elements to be inserted into the receptacles. The at least one projection on each of the first and second seals may comprise an arch extending outwardly from each of the first, second and third seals. At least one of the receptacles may comprise a recess positioned on an inner surface thereof for receiving the at least one projection extending from one of the first, second and third seals.

In another example embodiment of a fitting for connecting at least two pipe elements together, the fitting comprises first and second housing portions attached to one another and defining at least first and second receptacles, wherein the first receptacle is not coaxially aligned with the second receptacle. The first and second receptacles respectively define first and second openings for receiving the pipe elements. The housing portions further define a fluid path extending between the first and second receptacles.

A plurality of adjustable fasteners attach the first and second housing portions to one another. The fasteners are adjustably tightenable so as to draw the housing portions toward one another and bring the receptacles into engagement with the pipe elements so as to affix the pipe elements together. At least a first angularly oriented surface is located on the first housing portion, and at least a second angularly oriented surface is located on the second housing portion. The first and second angularly oriented surfaces are in facing relation and slide over one another when the fasteners are tightened to bring the first and second angularly oriented surfaces in contact. Sliding motion between the first and second angularly oriented surfaces cause the first and second housing portions to rotate in opposite directions relatively to one another.

In a particular example embodiment, the first receptacle is not coaxially aligned with the second receptacle. The first receptacle may surround a first axis oriented coaxially with the first opening, and the second receptacle may surround a second axis oriented coaxially with the second opening. The first and second axes are angularly oriented with respect to one another. The first and second axes may have an orientation angle from about 90° to about 174° with respect to one another.

In another example embodiment, the first and second housing portions may further define a third receptacle. The third receptacle defines a third opening for receiving one of the pipe elements. The housing portions further define the fluid path to extend between the first, second and third receptacles. In a particular example embodiment, the first receptacle surrounds a first axis oriented coaxially with the first opening, the second receptacle surrounds a second axis oriented coaxially with the second opening, and the third receptacle surrounds a third axis oriented coaxially with the third opening. The first and third axes are co-linear with one another, the second axis is angularly oriented with respect to the first and second axes. In this example embodiment the first and second axes may have an orientation angle from about 30° to about 150° with respect to one another.

In an example fitting embodiment, at least a second one of the lugs on the first housing portion may have a first angularly oriented surface, and at least a second one of the lugs on the second housing portion may have a second angularly oriented surface. Wherein, for the second ones of the lugs on the first and second housing portions, the first angularly oriented surface is in facing relation with the second angularly oriented surface, the first and second angularly oriented surfaces slide over one another when the fasteners are tightened to bring the first and second angularly oriented surfaces in contact. Sliding motion between the first and second angularly oriented surfaces causes the first and second housing portions to rotate in opposite directions relatively to one another.

The example fitting may further comprise a plurality of lugs extending from each of the first and second housing portions. Each of the lugs define a hole for receiving one of said fasteners. The first angularly oriented surface is located on one of the lugs on the first housing portion, and the second angularly oriented surface is located on one of said lugs on the second housing portion.

In an example fitting a first seal may be positioned within the first receptacle and surrounding the first opening, and a second seal may be positioned within the second receptacle and surrounding the second opening. A tube may extend within the fitting between the first and second seals. In one example embodiment, the tube is integrally formed with the first and second seals. In another example embodiment, the seals sealingly engage the tube when the seals are compressed between the first and second housing portions.

Another example fitting embodiment further comprises a first seal positioned within the first receptacle and surrounding the first opening, a second seal positioned within the second receptacle and surrounding the second opening, and a third seal positioned within the third receptacle and surrounding the third opening. A tube extends within the fitting between the first, second and third seals. In this embodiment the tube may be integrally formed with the first, second and third seals. Alternately, the seals may sealingly engage the tube when the seals are compressed between the first and second housing portions.

In an example fitting embodiment, the first and second housing portions may be supported in spaced relation sufficient to permit the pipe elements to be inserted into the receptacles while the housing portions are attached to one another, the housing portions being supported by contact with the first and second seals. In this embodiment, the first and second seals may have an outer circumference sized to support the housing portions in the spaced apart relation sufficient to permit the pipe elements to be inserted into the receptacles. Alternately, the first and second seals may each have at least one projection extending radially outwardly therefrom. The at least one projection on each of the seals engages one of the first and second housing portions and thereby supports the housing portions in the spaced apart relation sufficient to permit the pipe elements to be inserted into the receptacles. The at least one projection on each of the first and second seals may comprise an arch extending outwardly from each of the first and second seals. In this example, at least one of the receptacles may comprise a recess positioned on an inner surface thereof for receiving the at least one projection extending from one of the first and second seals.

In another example fitting, the first and second housing portions are supported in spaced relation sufficient to permit the pipe elements to be inserted into the receptacles while the housing portions are attached to one another, the housing portions being supported by contact with the first, second and third seals. In this example embodiment, the first, second and third seals may have an outer circumference sized to support the housing portions in the spaced apart relation sufficient to permit the pipe elements to be inserted into the receptacles. Alternately, the first, second and third seals may each have at least one projection extending radially outwardly therefrom. The at least one projection on each of the seals engages one of the first and second housing portions and thereby supports the housing portions in the spaced apart relation sufficient to permit the pipe elements to be inserted into the receptacles. The at least one projection on each of the first and second seals may comprise an arch extending outwardly from each of the first, second and third seals. In this example, at least one of the receptacles may comprise a recess positioned on an inner surface thereof for receiving the at least one projection extending from one of the first, second and third seals.

DETAILED DESCRIPTION

Figure 1:
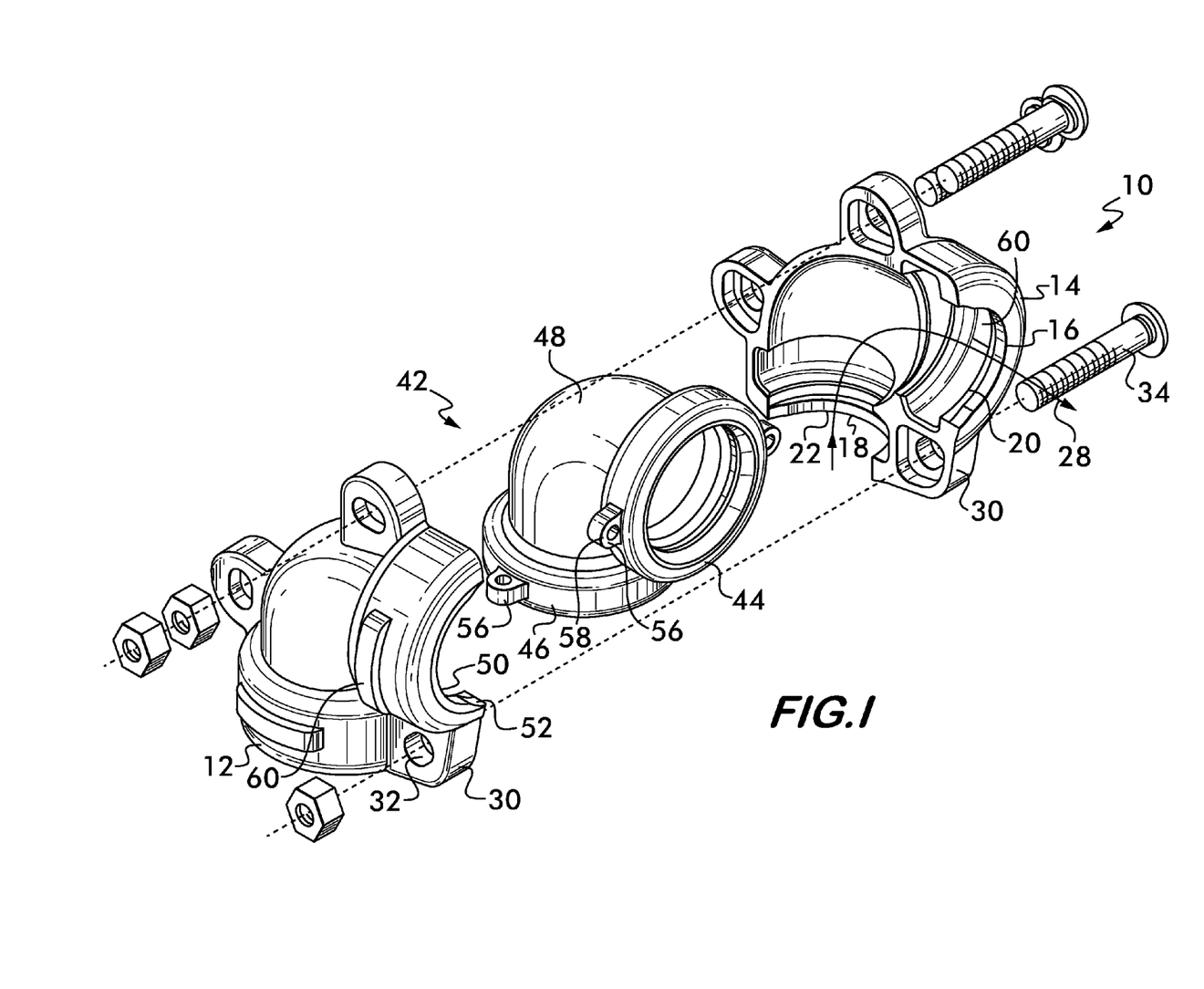
FIG. 1 is an exploded isometric view of an example elbow fitting according to the invention.
Figure 2:
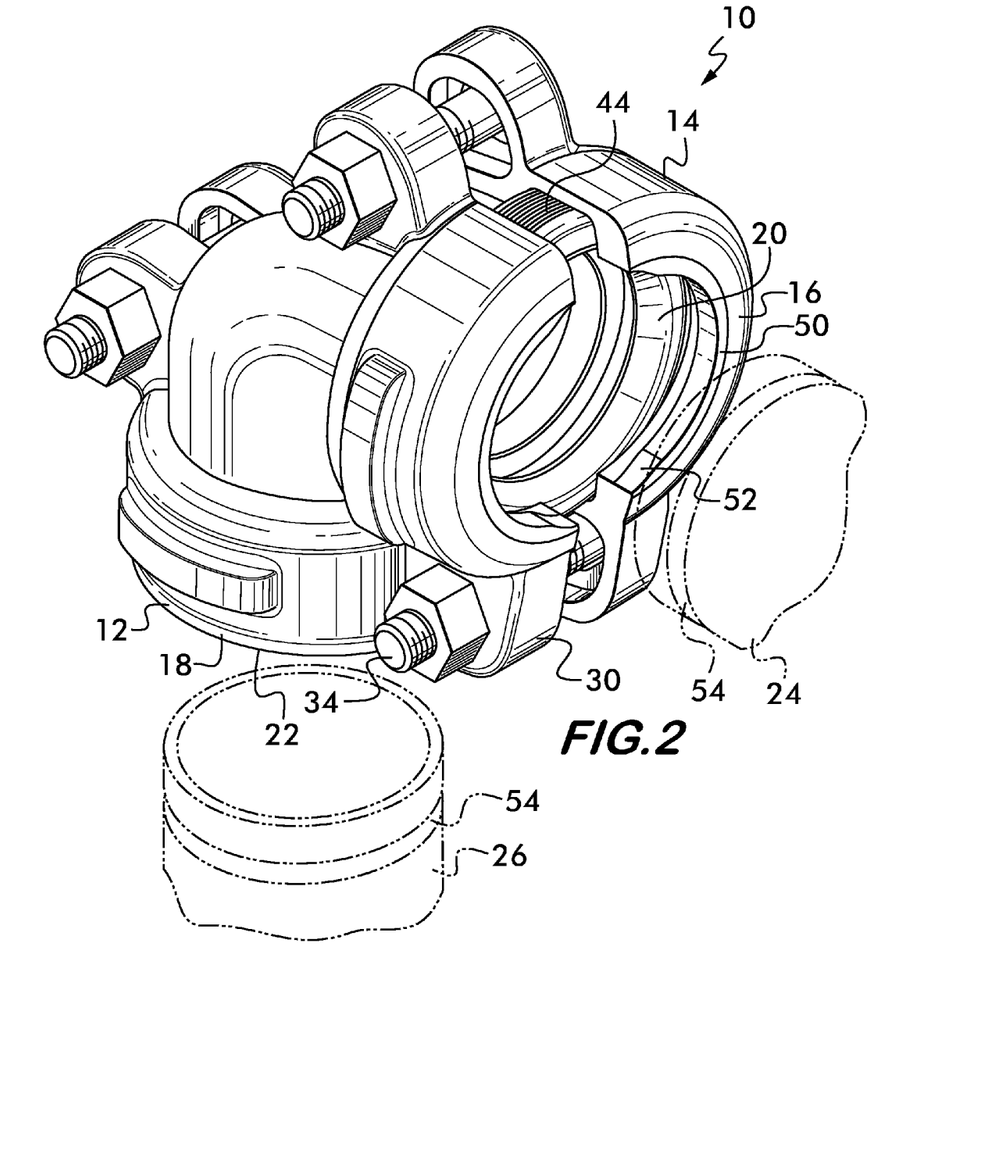
FIG. 2 is an isometric view of the elbow fitting shown in FIG. 1 preassembled in an installation ready configuration.

FIG. 1 shows an exploded view of an example fitting 10 according to the invention. Fitting 10 comprises first and second housing portions 12 and 14. When attached to one another, as shown in FIG. 2, the housing portions 12 and 14 define at least a first receptacle 16 and a second receptacle 18 located at opposite ends of the fitting to one another. Receptacles 16 and 18 define respective first and second openings 20 and 22 for receiving respective pipe elements 24 and 26, shown in phantom line. Housing portions 12 and 14 together also define a fluid path extending between the first and second receptacles 16 and 18, the fluid path being depicted by the arrow 28 shown in FIG. 1 for clarity.

Figure 3:
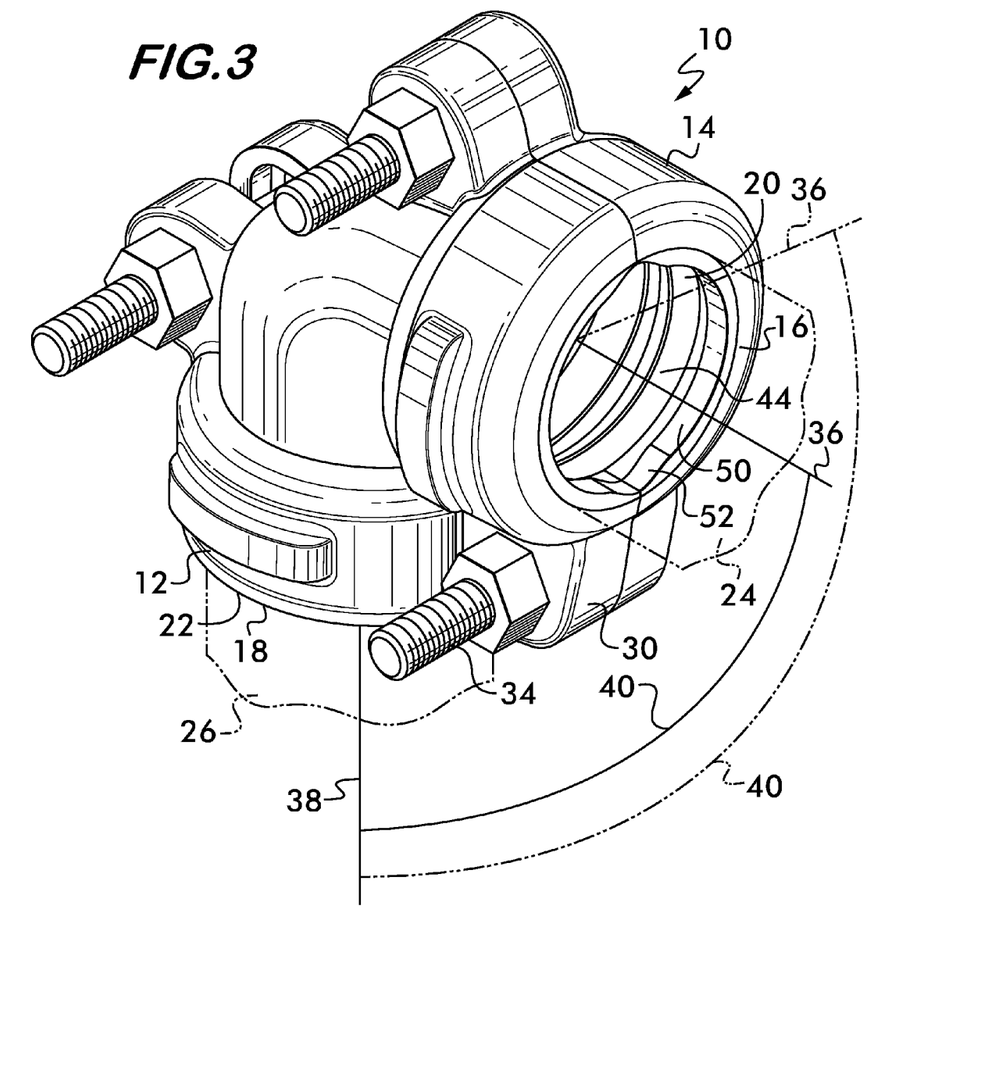
FIG. 3 is an isometric view of the elbow fitting shown in FIG. 1 joining pipe elements together.

A plurality of lugs 30 extend from each housing portion 12 and 14. In the example fitting of FIG. 1 each housing portion has three lugs. Lugs 30 define holes 32. When the housing portions 12 and 14 are assembled in facing relation as shown in FIG. 2, the holes 32 in lugs 30 align to receive fasteners 34 which attach the housing portions to one another to form the fitting 10. Fasteners 34 are adjustably tightenable so as to draw the first and second housing portions 12 and 14 toward one another and bring the first and second receptacles 16 and 18 into engagement with the pipe elements 24 and 26 (respectively) so as to affix the pipe elements together as shown in FIG. 3.

In the example fitting embodiment 10, the first receptacle 16 is not coaxially aligned with the second receptacle 18. As shown in FIG. 3, the first receptacle 16 surrounds a first axis 36 oriented coaxially with the first opening 20 and the second receptacle 18 surrounds a second axis 38 oriented coaxially with the second opening 22. Axes 36 and 38 may be used to define the angular orientation of the receptacles 16 and 18 relatively to one another and thereby define the type of fitting. In fitting 10, the orientation angle 40 between axes 36 and 38 is about 90°, marking this fitting as a 90 degree elbow. For practical elbow designs the orientation angle 40 may range from about 90° to about 174° as shown in phantom line.

To establish and maintain fluid tightness of a joint between pipe elements formed by the fitting 10, a sealing element 42 is positioned between the housing portions 12 and 14. As shown in FIG. 1, sealing element 42 comprises a first seal 44 positioned within the first receptacle 16, a second seal 46, positioned within the second receptacle 18, and a tube 48 extending within the fitting 10 along the fluid path 28 between the first and second seals 44 and 46. In this example, the first and second seals 44 and 46 are integrally formed with the tube 48 in one piece. Sealing element 42 may be formed from elastomeric materials such as EPDM, as well as nitrile, silicone, neoprene and fluoropolymer elastomers.

FIG. 2 shows the fitting 10 in the "installation ready" state, i.e., partially assembled with the first and second housing portions 12 and 14 held in spaced apart relation sufficient to permit the pipe elements 24 and 26 to be conveniently inserted into the respective openings 20 and 22 without disassembling the fitting 10. To effect a fluid tight joint, pipe elements 24 and 26 are inserted into opening 20 and 22 where they respectively engage the first and second seals 44 and 46. Fasteners 34 are then tightened, drawing the housing portions 12 and 14 together (as shown in FIG. 3) and compressing the first and second seals between the housing portions and the pipe elements 24 and 26 while also engaging the receptacles 16 and 18 with their respective pipe elements 24 and 26 to mechanically capture and retain the pipe elements. In this example, positive mechanical engagement between the fitting 10 and the pipe elements 24 and 26 is effected by radially projecting arcuate keys 50 positioned on each housing portion 12 and 14. Keys 50 may have notches 52 at opposite ends to provide clearance and facilitate pipe element insertion. Upon assembly of the fitting 10, the keys surround the openings 20 and 22 and engage circumferential grooves 54 in the pipe elements 24 and 26 (see FIG. 2). Fittings according to the invention are of course not limited to use with grooved pipe elements, but may also be adapted to plain end pipe elements, flared pipe elements as well as shoulder and shoulder and bead pipe elements.

Housing portions 12 and 14 may be conveniently supported in spaced relation by contact with the first and second seals 44 and 46. In the example fitting 10 shown in FIGS. 1 through 3, the first and second seals 44 and 46 each have projections 56 (see FIG. 1) which extend radially outward to engage a housing portion. In this example the projections take the form of an arch 58 which has sufficient stiffness to support the housing portions, yet will collapse when compressed between the housing portions as the fasteners are tightened to permit the seals 44 and 46 to be compressed and the keys 50 to engage the grooves 54 in the pipe elements 24 and 26. Housing portions 12 and 14 may also have recesses 60 positioned on the inner surfaces of the receptacles 16 and 18. The recesses 60 receive the projections 56 and provide space for their deformation when they are compressed by the housing portions 12 and 14.

Figure 4:
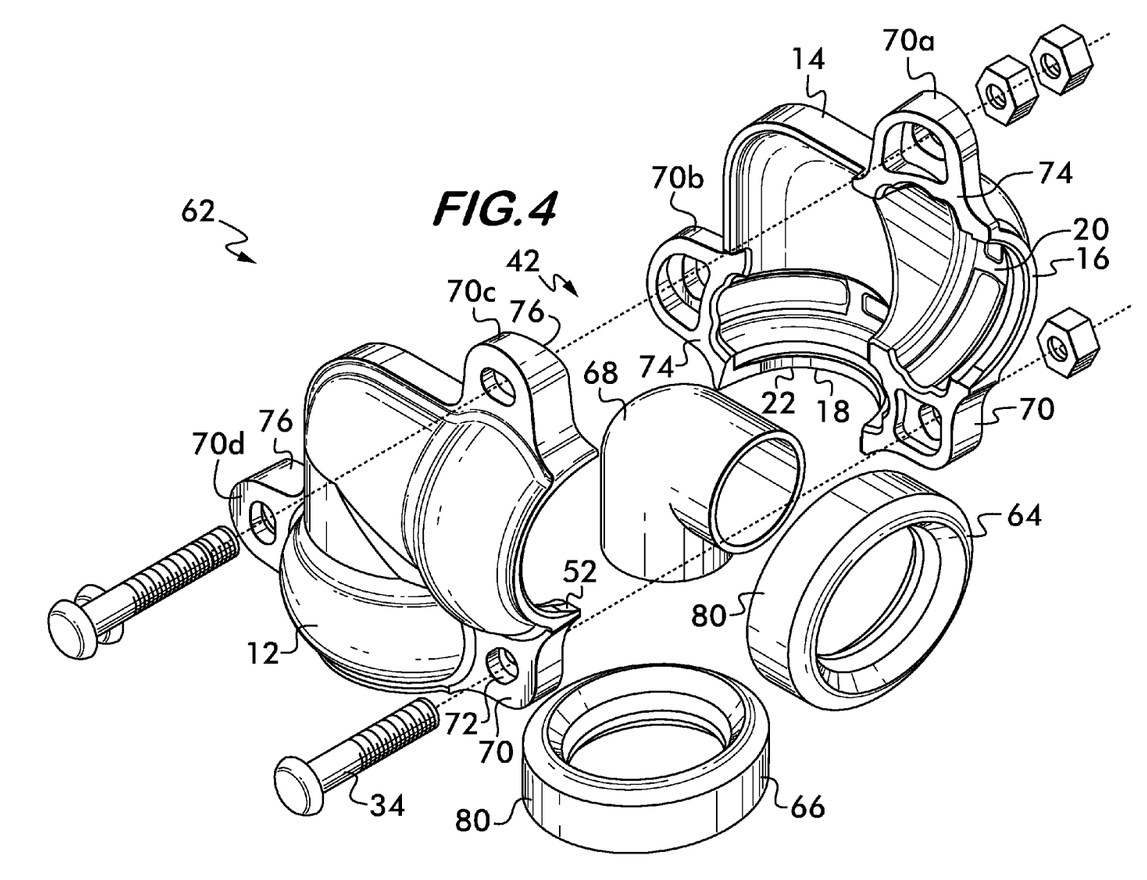
FIG. 4 is an isometric exploded view of an alternate embodiment of an elbow fitting according to the invention.
Figure 5:
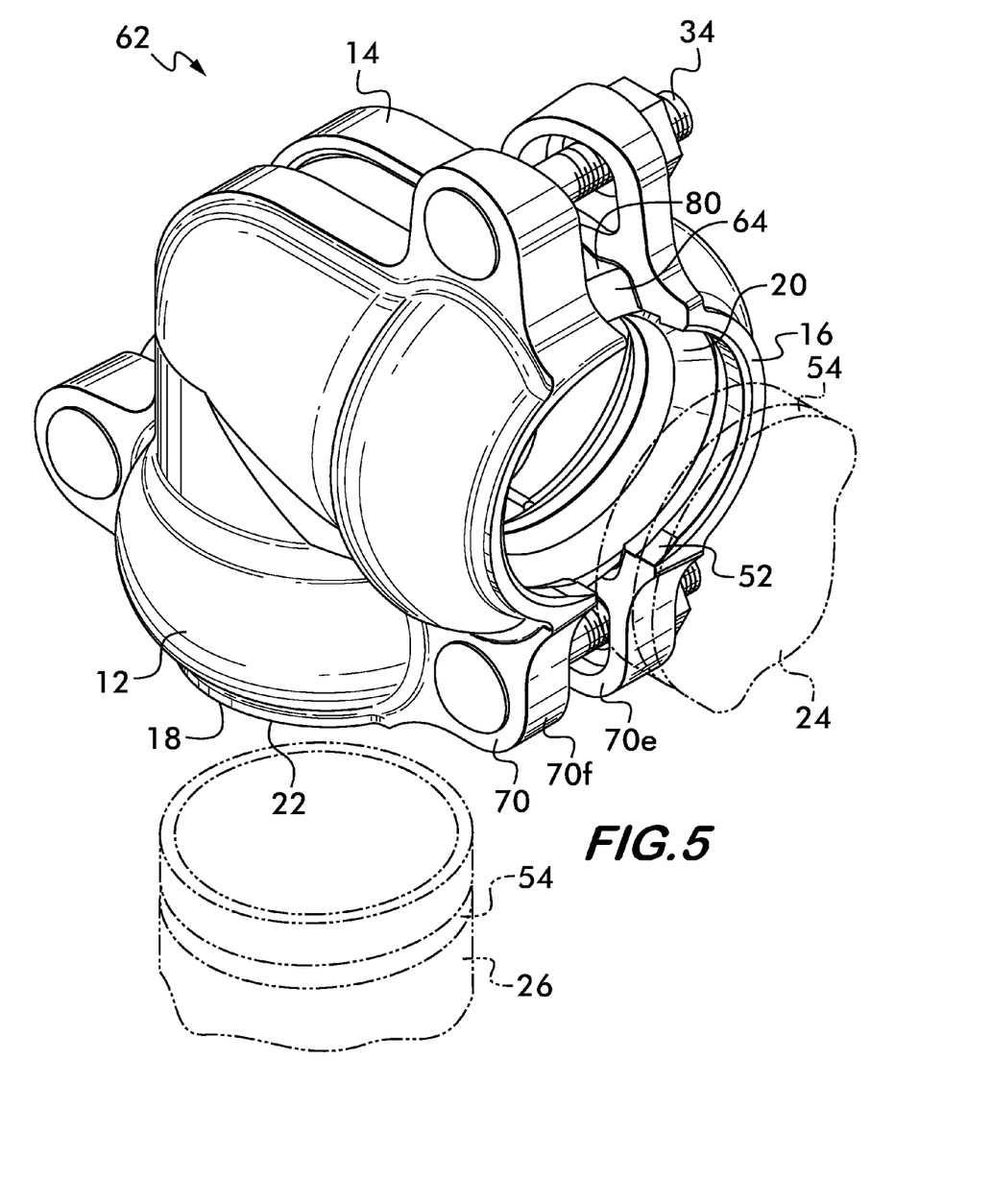
FIG. 5 is an isometric view of the elbow fitting shown in FIG. 4 preassembled in an installation ready configuration.
Figures 6, 7:
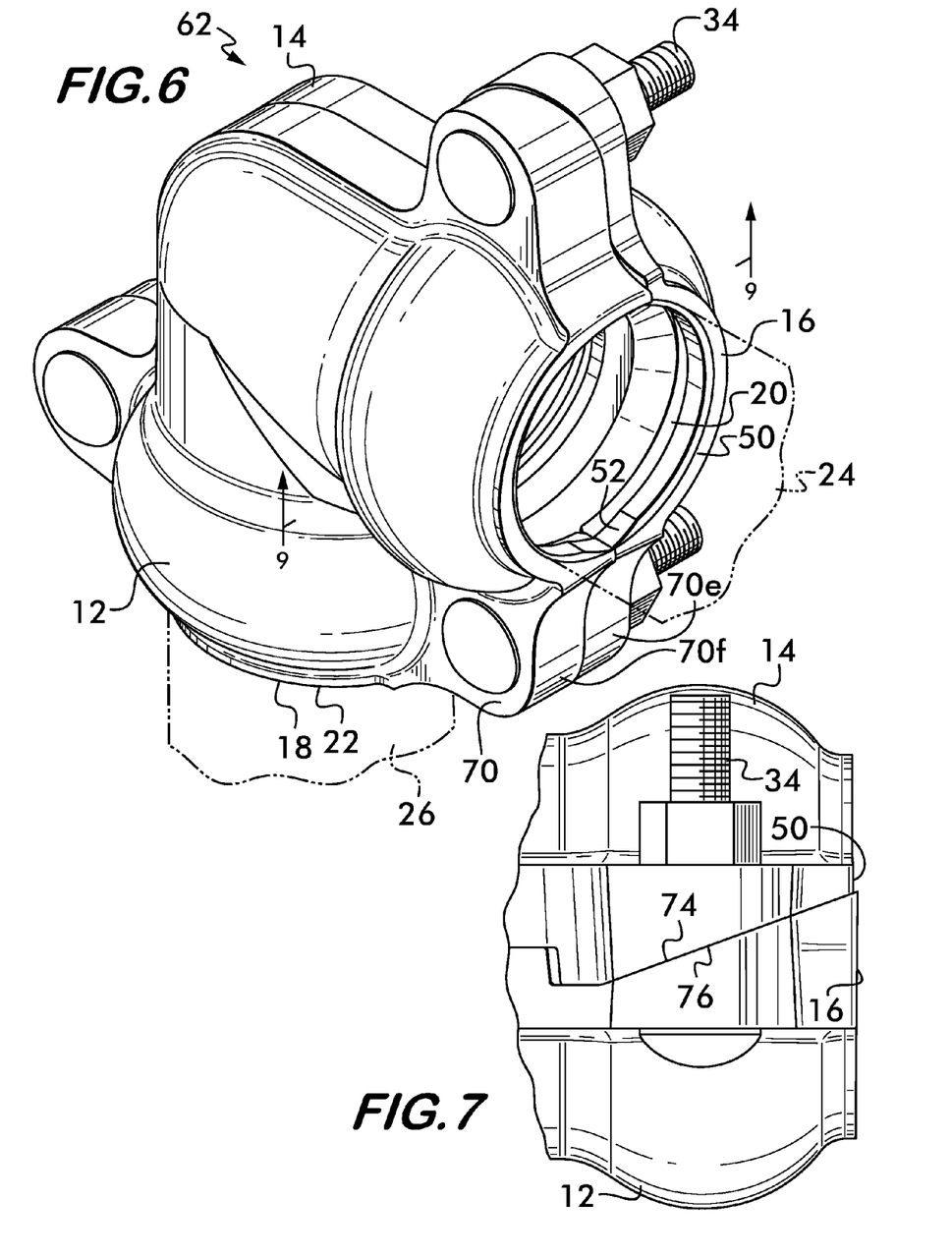
FIG. 6 is an isometric view of the elbow fitting shown in FIG. 4 joining pipe elements together.
FIGS. 7 and 8 are partial top views of the elbow fitting shown in FIG. 6.
Figures 8, 9:
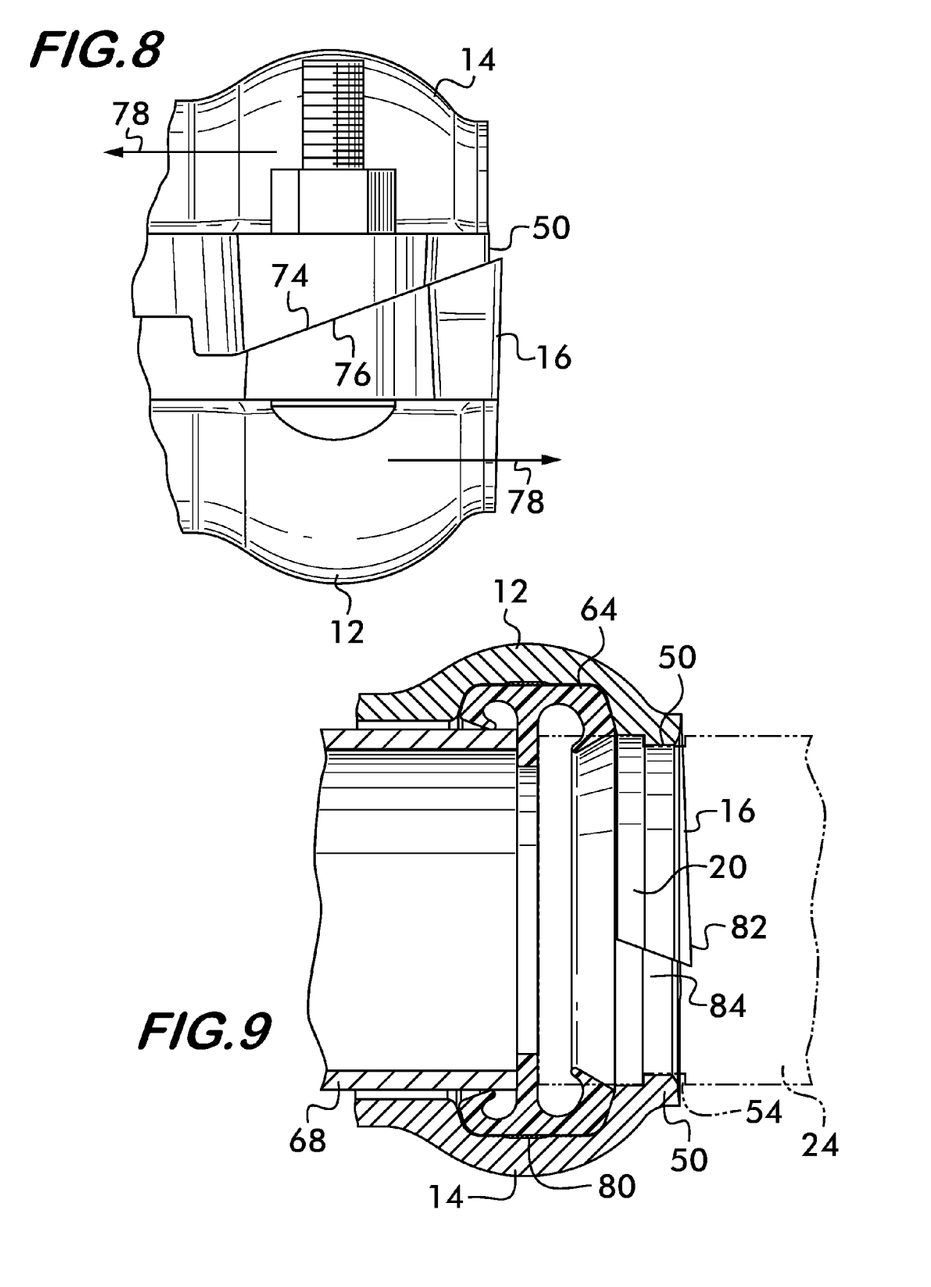
FIG. 9 is a longitudinal sectional view taken at line 9-9 of FIG. 6.

FIGS. 4 through 6 illustrate another example embodiment of a fitting 62 according to the invention. Similar to fitting 10, fitting 62 is comprised of housing portions 12 and 14 which are attached to one another by adjustable fasteners 34 and define first and second receptacles 16 and 18. The receptacles define openings 20 and 22 for receiving pipe elements 24 and 26 as shown in FIG. 5. As shown in FIG. 4, the sealing element 42 of fitting 62 is formed of three separate components and comprises first and second seals 64 and 66 and a tube 68. Seals 64 and 66 are respectively positioned within the first and second receptacles 16 and 18 defined by the housing portions and tube 68 extends within the fitting 62 between the seals 64 and 66. In this embodiment the seals 64 and 66 are made of a flexible material, for example, elastomers such as EPDM as well as nitrile, silicone, neoprene and fluoropolymer elastomers. The tube 68 is formed of a relatively more rigid material such as glass, ceramic, metal or one or more engineering polymers, including both thermoplastic and thermoset polymers. Exemplary rigid engineering thermoplastic polymers that can be used to form the tube 68 include polyphenylene and polystyrene. This choice of different materials allows the seals 64 and 66 to sealingly engage the tube 68 when they are compressed between the housing portions 12 and 14 as illustrated in FIG. 9. Sealing interaction between the seals 64 and 66, the pipe elements 24 and 26 and the tube 68 permits a fluid tight joint to be formed when fitting 62 is used to join pipe elements 24 and 26 together as shown in FIG. 6.

Similar to fitting 10, fitting 62 has a plurality of lugs 70 which extend from the first and second housing portions. Lugs 70 define holes 72 which align with one another and receive adjustable fasteners 34 for attaching the housing portions to one another when the fitting 62 is assembled as shown in FIGS. 5 and 6. As shown in FIG. 4, housing portion 14 has two angularly oriented surfaces 74. Housing portion 12 has similar surfaces 76 (not visible) which are also angularly oriented and parallel to the surfaces 74. Surfaces 74 are in facing relation with surfaces 76. When the fasteners 34 are tightened to draw the housing portions 12 and 14 toward one another the surfaces 74 interface with surfaces 76, and, due to their angular orientation, the surfaces slide relatively to one another causing the housing portions 12 and 14 to rotate in opposite directions relatively to one another. This action is illustrated in FIGS. 7 and 8, wherein FIG. 7 shows the point at which the surfaces 76 on housing portion 12 just come into contact with surfaces 74 on housing portion 14 as the fasteners 34 are tightened. FIG. 8 illustrates the rotated position of the housing portions as the fasteners 34 are further tightened, the compression force exerted by the fasteners causing the surfaces 74 and 76 to slide over one another in opposite directions and move the housing portions 12 and 14 in opposite directions to one another as indicated by arrows 78. This causes a misalignment of the keys 50 which surround the openings 20 and 22 defined by the receptacles 16 and 18 (only receptacle 16 being shown). When the keys 50 are engaged within a groove 54 in a pipe element such as 24 (see FIGS. 6 and 9) the keys are forced into contact with the groove side surfaces and effect a more rigid joint between the fitting and pipe elements than is obtained from fittings such as example 10 wherein the lug surfaces are not angularly oriented. Increased rigidity is realized in bending, axially, as well as in torsion. In this particular example fitting, angularly oriented surfaces 74 are positioned on lugs 70a and 70b of housing portion 14, and angularly oriented surfaces 76 are positioned on lugs 70c and 70d of housing portion 12. Although these surfaces could be located anywhere on the housing portions it is advantageous to locate the angularly oriented surfaces 74 and 76 near the fasteners 34 for enhanced effectiveness.

Like fitting 10, fitting 62 is also installation ready, meaning that it need not be disassembled to form a pipe joint. FIG. 5 shows the fitting 64 in the installation ready configuration with the housing portions 12 and 14 in spaced apart relation. In this example the housing portions are supported in spaced apart relation by contact with the first and second seals 64 and 66. As shown in FIG. 4, each of the first and second seals has an outer circumference 80 sized to support the housing portions 12 and 14 in spaced apart relation sufficient to permit the pipe elements 24 and 26 (see FIG. 5) to be inserted into the openings 20 and 22 without disassembling the fitting. Notches 52 in the ends of keys 50 facilitate pipe element insertion by providing clearance.

A method of assembly is illustrated in FIGS. 5 through 8. As shown by comparison of FIGS. 5 and 6, pipe elements 24 and 26 are inserted into the fitting in its installation ready configuration (FIG. 5) and the adjustable fasteners 34 are tightened to draw the housing portions 12 and 14 toward one another (FIG. 6). As the fasteners 34 are tightened, angled surfaces 74 and 76 on lugs 70a and 70c come into contact, as do the angled surfaces 74 and 76 on lugs 70b and 70d (FIG. 7). As the fasteners are further tightened, interfacing surfaces 74 and 76 slide relatively to one another, causing the housing portions 12 and 14 to rotate relatively to one another in opposite directions as shown by arrows 78 in FIG. 8, thereby causing the keys 50 to move out of alignment with one another and contact the sidewalls of the groove 54 in the pipe elements, the contact points being shown at 82 and 84 in FIG. 9. In this example fitting 62 the rotation occurs substantially about fastener 34 through lugs 70e and 70f.

Figure 10:
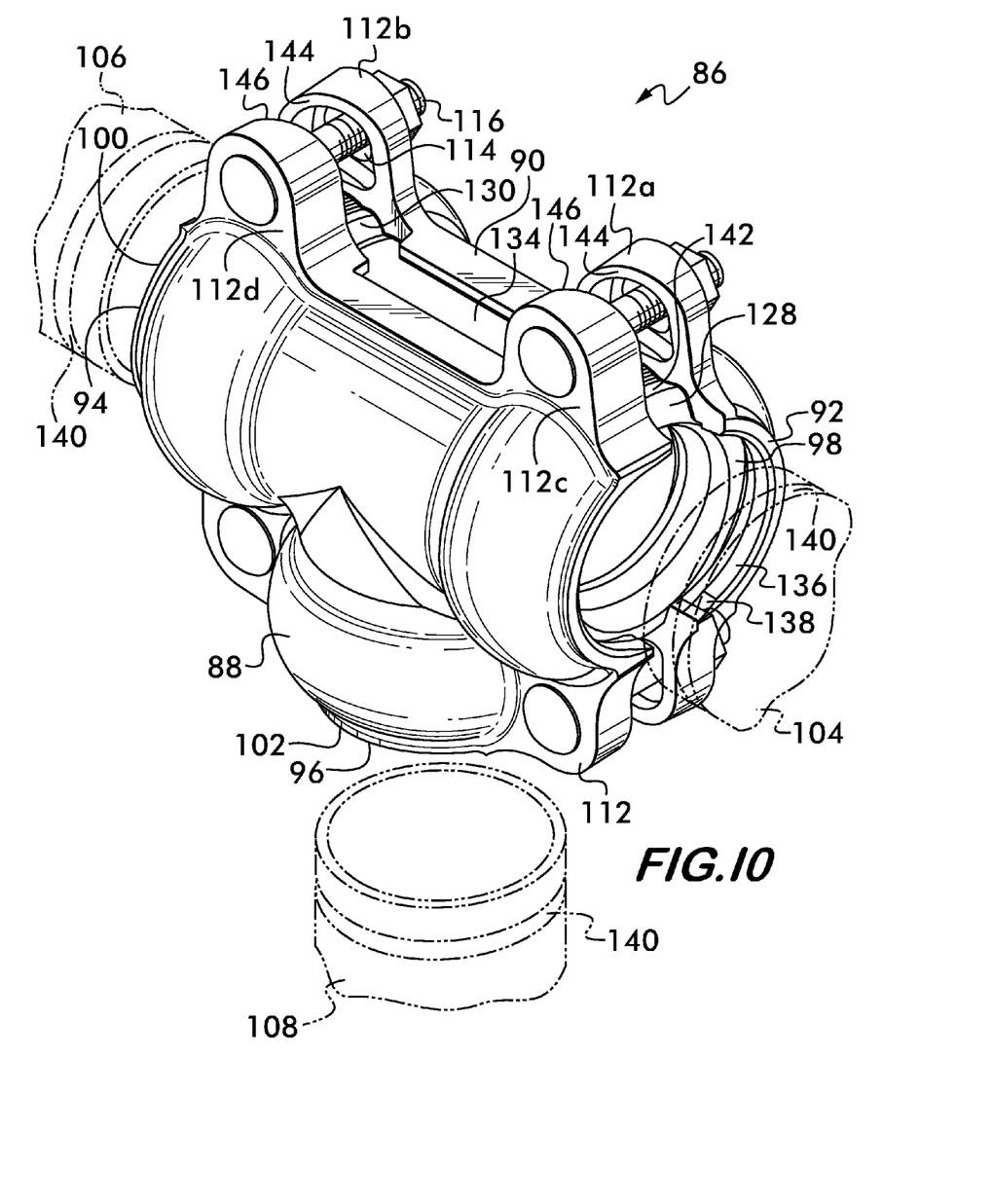
FIG. 10 is an isometric view of an example tee fitting according to the invention and shown pre-assembled in an installation ready configuration.
Figure 11:
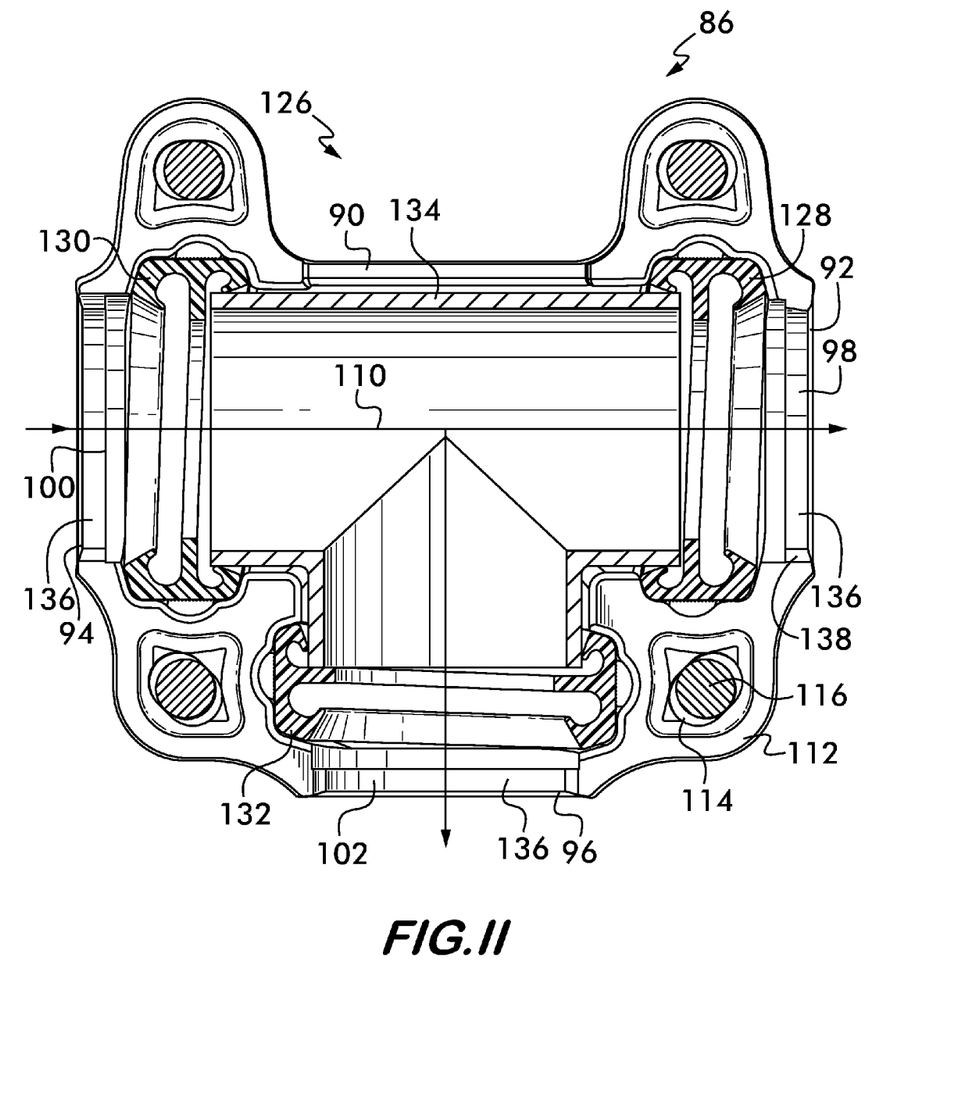
FIG. 11 is a side view of a portion of the tee fitting shown in FIG. 10 showing the internal surfaces of the fitting.
Figure 12:
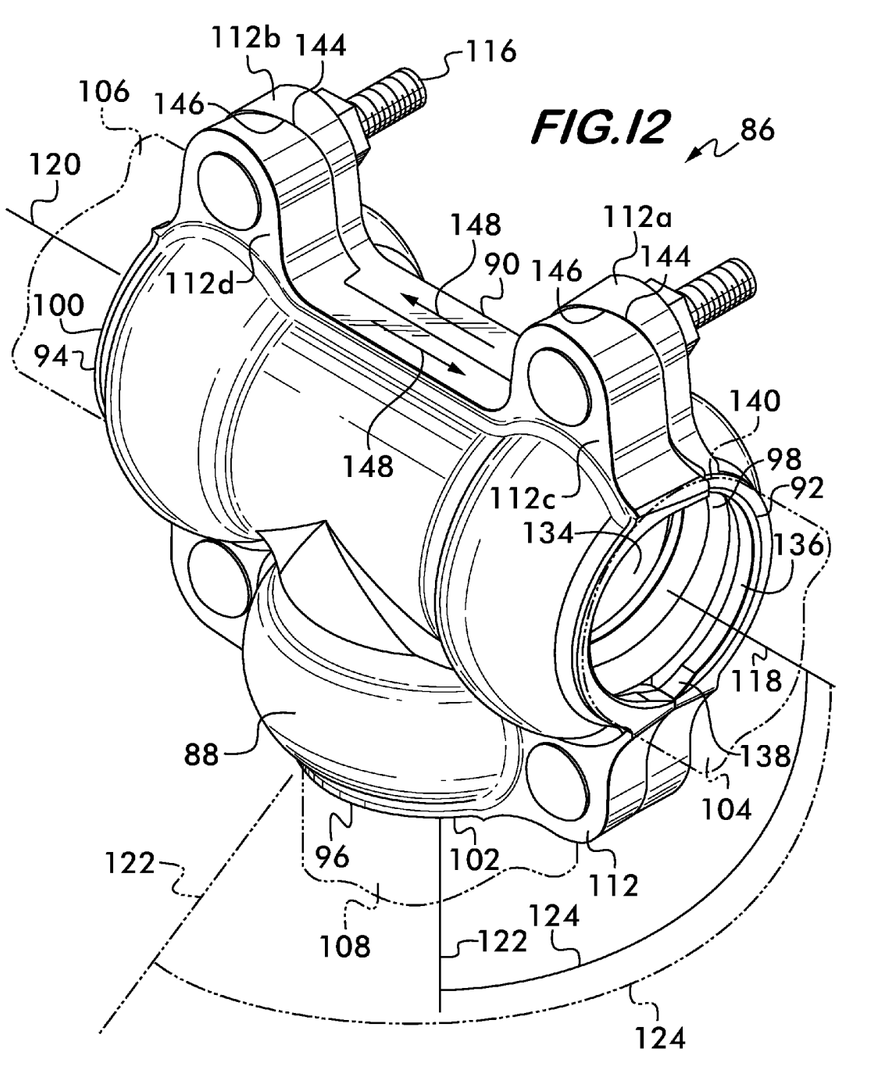
FIG. 12 is an isometric view o the fitting shown in FIG. 10 joining pipe elements together.

FIGS. 10 through 12 illustrate an example tee fitting 86 according to the invention. As shown in FIG. 10, fitting 86 comprises first and second housing portions 88 and 90. When attached to one another, the housing portions 88 and 90 define a first receptacle 92, a second receptacle 96 and a third receptacle 94. Receptacles 92, 96 and 94 define respective first, second and third openings 98, 102 and 100 for receiving respective pipe elements 104, 108 and 106, shown in phantom line. Housing portions 88 and 90 together also define a fluid path extending between the first, second and third receptacles 92, 96 and 94, the fluid path being depicted by the arrow 110 shown in FIG. 11 for clarity.

Again with reference to FIG. 10, a plurality of lugs 112 extend from each housing portion 88 and 90. In the example tee fitting 86 each housing portion has four lugs. Lugs 112 define holes 114. When the housing portions 88 and 90 are assembled in facing relation as shown in FIG. 10, the holes 114 in lugs 112 align to receive fasteners 116 which attach the housing portions to one another to form the tee fitting 86. Fasteners 116 are adjustably tightenable so as to draw the first and second housing portions 88 and 90 toward one another and bring the first, second and third receptacles 92, 94 and 96 into engagement with the pipe elements 104, 106 and 108 (respectively) so as to affix the pipe elements together as shown in FIG. 12.

In the example tee fitting embodiment 86, as shown in FIG. 12, the first receptacle 92 surrounds a first axis 118 oriented coaxially with the first opening 98. The second receptacle 96 surrounds a second axis 122 oriented coaxially with the second opening 102. The third receptacle 94 surrounds a third axis 120 oriented coaxially with the third opening 100. Axes 118, 120 and 122 may be used to describe the angular orientation of the receptacles 92, 94 and 96 relatively to one another. In the example tee fitting 86, the first receptacle 92 is co-linear with the third receptacle 94. The second receptacle 96 is oriented angularly with respect to the first and third receptacles. The orientation angle 124 between axes 122 and either axis 118 or 120 is about 90°. For practical tee designs the orientation angle 124 may range from about 30° to about 150° as shown in phantom line. It is further understood that the housing portions 88 and 90 make take any practical shape between the receptacles 92, 96 and 94. Thus, for example, particular sections extending between receptacles may be straight segments as shown, or may be curved, so long as the receptacles are oriented with respect to one another as defined by the orientation angles between their respective axes as defined herein and illustrated in FIG. 12.

To establish and maintain fluid tightness of a joint between pipe elements formed by the tee fitting 86, a sealing element 126, shown in FIG. 11, is positioned between the housing portions 88 and 90. Sealing element 126 comprises a first seal 128 positioned within the first receptacle 92, a second seal 130, positioned within the second receptacle 94, and a third seal 132 positioned within the third receptacle 96. A tube 134 extends within the tee fitting 86 along the fluid path described by arrow 110 between the first, second and third seals 128, 130 and 132. In this example, the first second and third seals are separate from the tube 134, but it is understood that the sealing element 126 comprising the three seals and the tube could be formed integrally from one piece similar to the sealing element 42 shown in FIG. 1. When formed from one piece the sealing element 126 may be formed from elastomeric materials such as EPDM, as well as nitrile, silicone, neoprene and fluoropolymer elastomers. When sealing element 126 is formed as separate pieces as shown in FIG. 11 the seals 128, 130 and 132 may be formed of a flexible elastic material, for example an elastomer such as EPDM, as well as nitrile, silicone, neoprene and fluoropolymer elastomers. The tube 68 is formed of a relatively more rigid material such as glass, ceramic, metal or one or more engineering polymers, including both thermoplastic and thermoset polymers. Exemplary rigid engineering thermoplastic polymers that can be used to form the tube 68 include polyphenylene and polystyrene.

FIG. 10 shows the tee fitting 86 in the "installation ready" state, i.e., partially assembled with the first and second housing portions 88 and 90 held in spaced apart relation sufficient to permit the pipe elements 104, 106 and 108 to be conveniently inserted into the respective openings 98, 100 and 102 without disassembling the tee fitting. To effect a fluid tight joint, pipe elements 104, 106 and 108 are inserted into openings 98, 100 and 102 where they respectively engage the first, second and third seals 128, 130 and 132. Fasteners 116 are then tightened, drawing the housing portions 88 and 90 together (as shown in FIG. 12) and compressing the first, second and third seals between the housing portions and the pipe elements 104, 106 and 108 while also engaging the receptacles 92, 94 and 96 with their respective pipe elements 104, 106 and 108 to mechanically capture and retain the pipe elements together. In this example, positive mechanical engagement between the tee fitting 86 and the pipe elements 104, 106 and 108 is effected by radially projecting arcuate keys 136 positioned on each housing portion 88 and 90. Keys 136 may have notches 138 at opposite ends to provide clearance and facilitate pipe element insertion. Upon assembly of the tee fitting 86, the keys surround the openings 98, 100 and 102 and engage circumferential grooves 140 in the pipe elements 104, 106 and 108. Tee fittings according to the invention are of course not limited to use with grooved pipe elements, but may also be adapted to plain end pipe elements, flared pipe elements as well as shoulder and shoulder and bead pipe elements.

Housing portions 88 and 90 may be conveniently supported in spaced relation by contact with the first, second and third seals 128, 130 and 132. In the example tee fitting 86 shown in FIGS. 10 through 12, the housing portions 88 and 90 are supported in spaced apart relation by contact with the first, second and third seals 128, 130 and 132. As shown in FIG. 10, each of the seals has an outer circumference 142 sized to support the housing portions 88 and 90 in spaced apart relation sufficient to permit the pipe elements 104, 106 and 108 to be inserted into the openings 98, 100 and 102 without disassembling the tee fitting. In an alternate embodiment of the sealing element similar to sealing element 42 described previously and shown in FIG. 1, the first, second and third seals 128, 130 and 132 of the sealing element 126 may each have projections which extend radially outward to engage a housing portion. The projections may take the form of an arch which has sufficient stiffness to support the housing portions, yet will collapse when compressed between the housing portions as the fasteners are tightened to permit the seals 128, 130 and 132 to be compressed and the keys 136 to engage the grooves 140 in the pipe elements 104, 106 and 108. When a seal with projections is used the housing portions 88 and 90 may also have recesses similar to recesses 60 shown in FIG. 1. The recesses would be positioned on the inner surfaces of the receptacles 92, 94 and 96. The recesses would be designed to receive the projections and provide space for their deformation when they are compressed by the housing portions 88 and 90.

The tee fitting 86 may be designed to provide a relatively flexible joint, or a relatively rigid joint. To effect a relatively flexible joint, the lugs 112 interface with one another at surfaces which are not angularly oriented. Such surfaces do not cause relative rotation between the housing portions 88 and 90 and the keys 136 may be designed to engage the grooves 140 and contact only one groove side surface. To effect a more rigid joint as in the example tee fitting 86 as shown, two of the lugs 112a and 112b on housing portion 90 each have an angularly oriented surface 144. Lugs 112c and 112d on housing portion 88 have similar surfaces 146 (not visible) which are also angularly oriented and parallel to the surfaces 144 on lugs 112a and 112b. Surface 144 on lug 112a is in facing relation with surface 146 on lug 112c; surface 144 on lug 112b is in facing relation with surface 146 on lug 112d. When the fasteners 116 are tightened to draw the housing portions 88 and 90 toward one another the surfaces 144 interface with surfaces 146, and, due to their angular orientation, the surfaces slide relatively to one another causing the housing portions 88 and 90 to rotate in opposite directions relatively to one another. This action is illustrated in FIG. 12, which shows the rotated position of the housing portions as the fasteners 116 are fully tightened. The compression force exerted by the fasteners causes the surfaces 144 and 146 to slide over one another in opposite directions and move the housing portions 88 and 90 in opposite directions to one another as indicated by arrows 148. This causes a misalignment of the keys 136 which surround the openings 98, 100 and 102 defined by the receptacles 92, 94 and 96. When the keys 136 are engaged within a groove 140 in a pipe element such as 104, 106 or 108, the keys are forced into contact with the groove side surfaces and effect a more rigid joint between the fitting and pipe elements than is obtained from fittings wherein the lug surfaces are not angularly oriented. Increased rigidity is realized in bending, axially, as well as in torsion.

Elbow and tee fittings according to the invention provide for greatly increased efficiency in the formation of pipe joints as it is not necessary to disassemble and reassemble the fitting to create the joint.

What is claimed is:

1. A fitting for connecting at least two pipe elements together, said fitting comprising:
   first and second housing portions attached to one another and defining at least first and second receptacles wherein said first receptacle is not coaxially aligned with said second receptacle, said first and second receptacles respectively defining first and second openings for receiving said pipe elements, said housing portions further defining a fluid path extending between said first and second receptacles;
   a plurality of adjustable fasteners attaching said first and second housing portions to one another, said fasteners being adjustably tightenable so as to draw said housing portions toward one another and bring said receptacles into engagement with said pipe elements so as to affix said pipe elements together;
   at least a first angularly oriented surface located on said first housing portion;
   at least a second angularly oriented surface located on said second housing portion, said first and second angularly oriented surfaces being in facing relation and sliding over one another when said fasteners are tightened to bring said first and second angularly oriented surfaces in contact, sliding motion between said first and second angularly oriented surfaces causing said first and second housing portions to rotate in opposite directions relatively to one another.

2. The fitting according to claim 1, wherein said first receptacle surrounds a first axis oriented coaxially with said first opening and said second receptacle surrounds a second axis oriented coaxially with said second opening, said first and second axes being angularly oriented with respect to one another.

3. The fitting according to claim 2, wherein said first and second axes have an orientation angle from about 90° to about 174° with respect to one another.

4. The fitting according to claim 1, wherein said first and second housing portions further define a third receptacle, said third receptacle defining a third opening for receiving one of said pipe elements, said housing portions further defining said fluid path to extend between said first, second and third receptacles.

5. The fitting according to claim 4, wherein said first receptacle surrounds a first axis oriented coaxially with said first opening, said second receptacle surrounds a second axis oriented coaxially with said second opening, and said third receptacle surrounds a third axis oriented coaxially with said third opening, said first and third axes being co-linear with one another, said second axis being angularly oriented with respect to said first and third axes.

6. The fitting according to claim 5, wherein said first and second axes have an orientation angle from about 30° to about 150° with respect to one another.

7. The fitting according to claim 4, further comprising:
   a first seal positioned within said first receptacle and surrounding said first opening;
   a second seal positioned within said second receptacle and surrounding said second opening;
   a third seal positioned within said third receptacle and surrounding said third opening;
   a tube extending within said fitting between said first, second and third seals.

8. The fitting according to claim 7, wherein said tube is integrally formed with said first, second and third seals.

9. The fitting according to claim 7, wherein said seals sealingly engage said tube when said seals are compressed between said first and second housing portions.

10. The fitting according to claim 7, wherein said first and second housing portions are supported in spaced relation sufficient to permit said pipe elements to be inserted into said receptacles while said housing portions are attached to one another, said housing portions being supported by contact with said first, second and third seals.

11. The fitting according to claim 10, wherein said first, second and third seals have an outer circumference sized to support said housing portions in said spaced apart relation sufficient to permit said pipe elements to be inserted into said receptacles.

12. The fitting according to claim 10, wherein said first, second and third seals each have at least one projection extending radially outwardly therefrom, said at least one projection on each of said seals engaging one of said first and second housing portions and thereby supporting said housing portions in said spaced apart relation sufficient to permit said pipe elements to be inserted into said receptacles.

13. The fitting according to claim 12, wherein said at least one projection on each of said first, second and third seals comprises an arch extending outwardly from each of said first, second and third seals.

14. The fitting according to claim 12, wherein at least one of said receptacles comprises a recess positioned on an inner surface thereof for receiving said at least one projection extending from one of said first, second and third seals.

15. The fitting according to claim 1, further comprising:
a plurality of lugs extending from each of said first and second housing portions, each of said lugs defining a hole for receiving one of said fasteners;
said first angularly oriented surface being located on one of said lugs on said first housing portion; and
said second angularly oriented surface being located on one of said lugs on said second housing portion.

16. The fitting according to claim 1, further comprising:
a first seal positioned within said first receptacle and surrounding said first opening;
a second seal positioned within said second receptacle and surrounding said second opening;
a tube extending within said fitting between said first and second seals.

17. The fitting according to claim 16, wherein said tube is integrally formed with said first and second seals.

18. The fitting according to claim 16, wherein said seals sealingly engage said tube when said seals are compressed between said first and second housing portions.

19. The fitting according to claim 16, wherein said first and second housing portions are supported in spaced relation sufficient to permit said pipe elements to be inserted into said receptacles while said housing portions are attached to one another, said housing portions being supported by contact with said first and second seals.

20. The fitting according to claim 19, wherein said first and second seals have an outer circumference sized to support said housing portions in said spaced apart relation sufficient to permit said pipe elements to be inserted into said receptacles.

21. The fitting according to claim 19, wherein said first and second seals each have at least one projection extending radially outwardly therefrom, said at least one projection on each of said seals engaging one of said first and second housing portions and thereby supporting said housing portions in said spaced apart relation sufficient to permit said pipe elements to be inserted into said receptacles.

22. The fitting according to claim 21, wherein said at least one projection on each of said first and second seals comprises an arch extending outwardly from each of said first and second seals.

23. The fitting according to claim 21, wherein at least one of said receptacles comprises a recess positioned on an inner surface thereof for receiving said at least one projection extending from one of said first and second seals.

* * * * *